United States Patent [19]

Baldauf et al.

[11] Patent Number: 4,706,548

[45] Date of Patent: Nov. 17, 1987

[54] TWO-HAND SAFETY CONTROL MECHANISM

[75] Inventors: Günter Baldauf, Rommelshausen; Helmut Ott, Stuttgart, both of Fed. Rep. of Germany

[73] Assignee: Herion Werke KG, Fellbach, Fed. Rep. of Germany

[21] Appl. No.: 897,752

[22] Filed: Aug. 18, 1986

[30] Foreign Application Priority Data

Aug. 20, 1985 [DE] Fed. Rep. of Germany ....... 3529802

[51] Int. Cl.⁴ ............................................. F15B 13/04
[52] U.S. Cl. ........................................ 91/424; 91/462
[58] Field of Search .................. 91/424, 462, 420, 425

[56] References Cited

U.S. PATENT DOCUMENTS 2,613,787 10/1952 Ledig ............................... 91/424 X
2,974,637 3/1961 Holmes et al. ..................... 91/424 X
3,170,484 2/1965 Benz et al. ........................ 91/424 X

OTHER PUBLICATIONS

Fluidic Circuit, Western Electric Technical Dig. No. 23, 7/1971, p. 51.

*Primary Examiner*—William E. Wayner
*Attorney, Agent, or Firm*—Henry M. Feiereisen

[57] ABSTRACT

A two hand safety control mechanism for a consumer actuated by pressure medium includes a safety valve blocking the supply of pressure medium during a faulty switching and venting the consumer. For maintaining a working position of the consumer, a plurality of control valves are provided which are dynamically self-regulating. By actuating a further control valve, the automatic retention can be cancelled in order to allow the consumer to return in its idle position.

18 Claims, 8 Drawing Figures

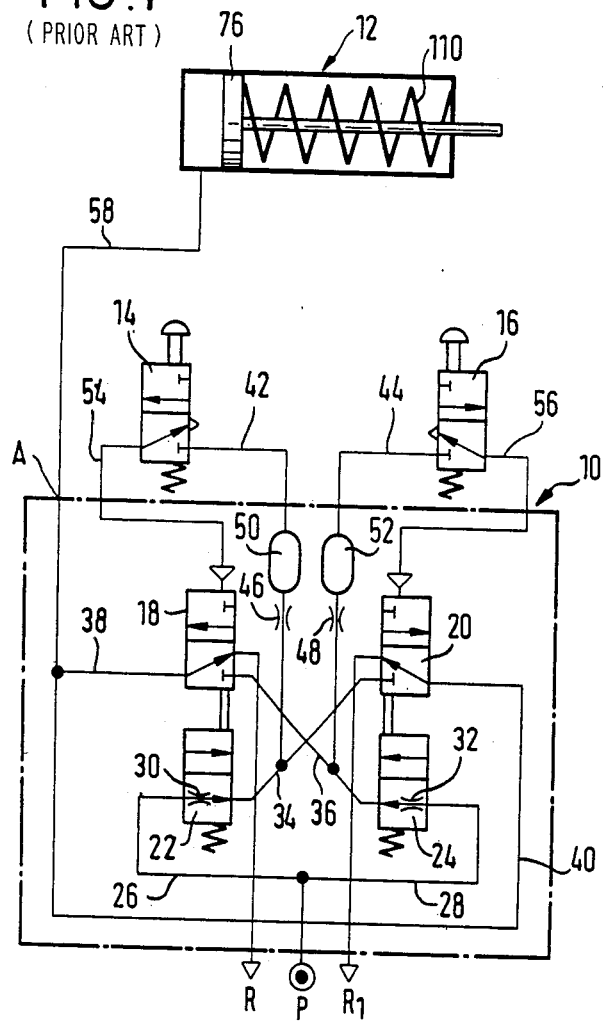

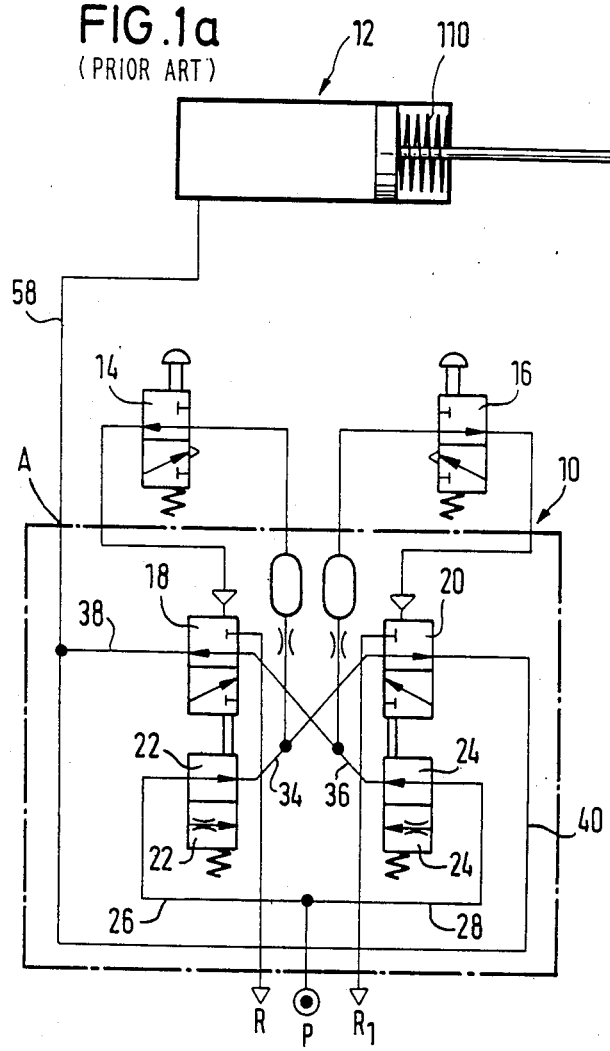

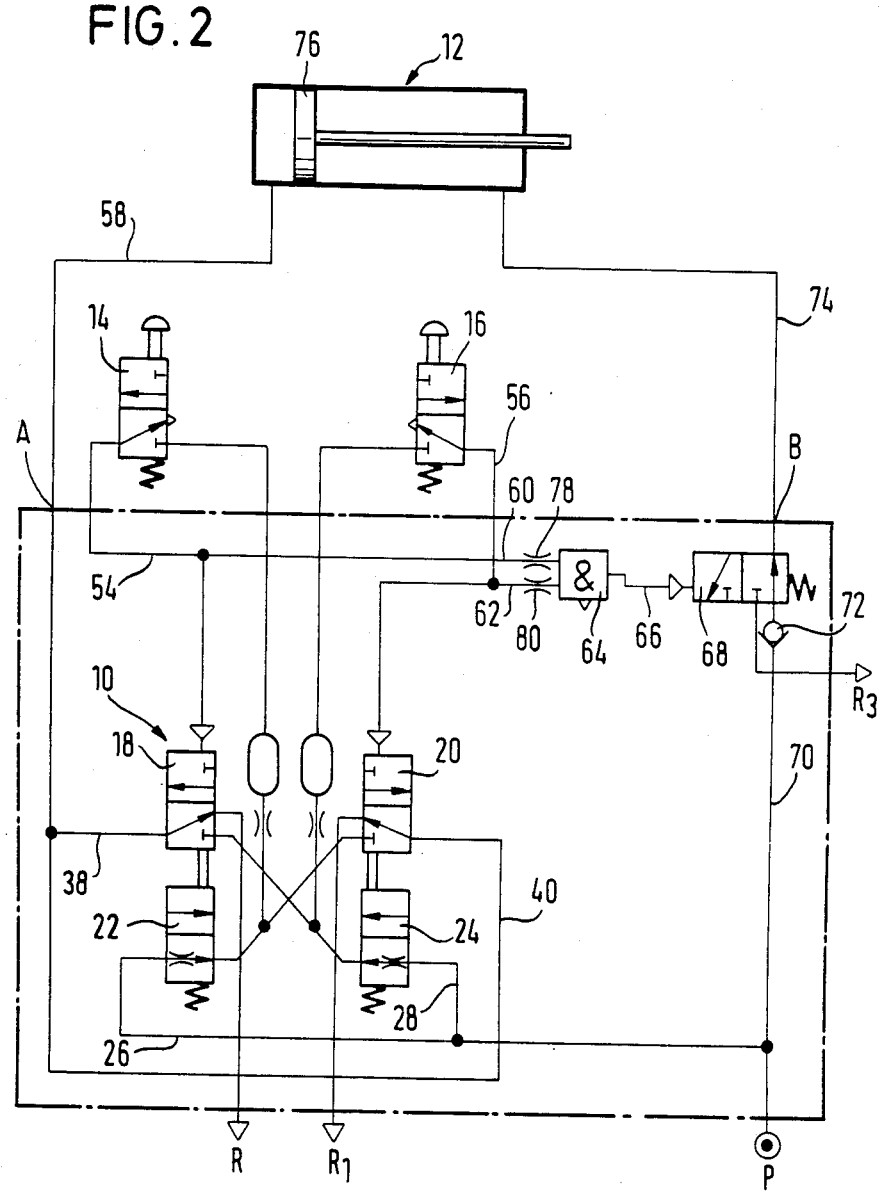

TWO-HAND SAFETY CONTROL MECHANISM

FIELD OF THE INVENTION

The present invention refers to a two-hand safety control mechanism for consumer operated by a pressure medium.

BACKGROUND OF THE INVENTION

From the German patent DE-PS No. 30 05 547, a safety mechanism is known including a safety valve which has two directional control valves placed in parallel and controlled by associated pilot valves. Each directional control valve is mechanically linked to a slide gate and connected to a supply inlet for the pressure medium via the slide gate of the other control valve. The pressure medium is supplied to one side of the consumer via a respective connection to which the directional control valves are linked.

Such a safety valve is used in a consumer which e.g. consists of a cylinder in which a piston reciprocates and in which the pressure medium is admitted at one side to move the piston from its idle position to its working position. Return of the consumer in its idle position is provided by a spring which acts on the piston.

SUMMARY OF THE INVENTION

One object of the invention is to provide an improved safety valve which allows an admission of pressure medium at both sides of the consumer.

This object and others which will become apparent hereinafter are realized in accordance with the present invention by providing a further directional control valve which is directly connected to the supply inlet for the pressure medium and which is controlled by the output of an AND-valve whose inputs are operatively connected to the control lines linking the pilot valves with the directional control valves.

Through the provision of such an AND-valve and further directional control valve, the necessity of mechanical means like springs and the like is avoided in order to return the piston into its idle position when no pressure prevails at one side thereof as the pressure medium directly flows to the other side of the piston. On the other hand, when pressure medium is admitted to the cylinder to shirt the piston, the further control valve is interrupted from the supply inlet by the output of the AND-valve and is linked to a vent connection to relieve the other side of the piston.

In accordance with another feature of the present invention, the working position of the consumer can be maintained without continuous actuation of the pilot valves by providing two OR-valves whose one input is respectively connected to the pilot valves. The other input of one OR-valve is controlled by a control valve which is actuated by the consumer when being in working position while the other input of the other OR-valve is controlled by a still further directional control valve which in turn is controlled by the output of the AND-valve.

To cancel the automatic retention of the working position of the consumer, a further control valve is to be actuated which is arranged between the output of one OR-valve and one input of the AND-valve.

BRIEF DESCRIPTION OF THE DRAWING

The above objects, features and advantages of the present invention will now be described in more detail with reference to the accompanying drawing in which:

FIG. 1 is a schematic illustration of a conventional safety valve in its idle position;

FIG. 1a is a schematic illustration of the safety valve of FIG. 1 in its switch position;

FIG. 2 is a schematic illustration of one embodiment of a two-hand safety control mechanism according to the invention;

DETAILED DESCRIPTION OF PREFERRED EMBODIMENTS

Figure 1B:
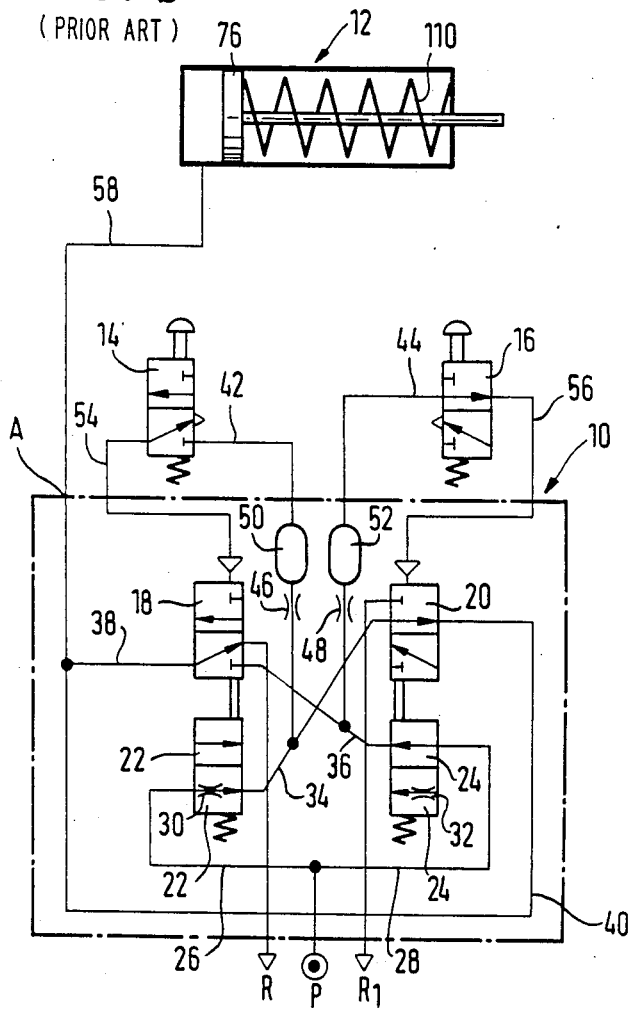
FIG. 1b is a schematic illustration of the safety valve of FIG. 1 during faulty switching.

Referring firstly to FIG. 1 which shows schematically a conventional two-hand safety control mechanism including a safety valve generally designated by reference numeral 10. Cooperating with the safety valve 10 is a consumer generally designated by reference numeral 12 and including a single-acting cylinder 75 which accommodates a piston 76 with piston rod 77. By admission of a pressure medium e.g. compressed air via a consumer line 58 into the space of the cylinder at the end face of the piston 76, the hydraulic power is converted into a linear motion of the piston 76. Arranged along the piston rod 77 is a compression spring 110 which acts continuously upon the piston rod side of the piston 76.

The safety valve 10 includes two directional control valves 18,20 which are placed in parallel and actuated by pilot valves 14,16. Each control valve 18,20 is mechanically affixed to a slide gate 22,24 which is provided with a diaphragm gland or throttle 30,32.

In FIG. 1, the safety valve 10 is in its idle position so that the consumer 12 occupies its initial position in which the piston 76 is under the action of the spring 110 and thus is in its left position. The pressure medium introduced through inlet P branches at junction 25 into lines 26 and 28 and flows via throttles 30,32 of slide gates 22,24 and liner 34,36 to the directional control valves 18,20, respectively. Both control valves 18,20 are closed so that the pressure medium is prevented from flowing to the consumer 12 which thus occupies the position as shown in FIG. 1.

Branching off the line 34 is a select line 42 leading to the pilot valve 14. Interposed in line 42 is a throttle 46 and subsequently a reservoir 50. In like manner, a select line 44 branches off line 36 and leads via a throttle 48 and subsequent reservoir 52 to the pilot valve 16. Connecting the pilot valve 14 with the control valve 18 is a control line 54 while a control line 56 links pilot valve 16 with the control valve 20.

In the idle position of the safety valve 10, the pressure medium flowing from inlet P via slide gates 22,24, lines 34,36 and lines 42,44 is introduced into the reservoirs 50,52 which are thus filled so that the working pressure builds up at the control valves 18,20 as well as at the pilot valves 14,16.

Upon actuating simultaneously or within a certain time interval of e.g. 0.5 s both pilot valves 14,16, the directional control valves 18,20 and the attached slide gates 22,24 are reversed into switch position as illustrated in FIG. 1a. Consequently, the pressure medium flows from inlet P via slide gate 22 of control valve 18 to the control valve 20 and further via line 40 and consumer line 58 to consumer 12. Simultaneously, the pressure medium flows from inlet P via slide gate 24 of control valve 20 to the control valve 18 and then via line 38 into the consumer line 58. By introducing the pressure medium into the cylinder 75 of consumer 12, the piston 76 is shifted counter to the force exerted by the spring 110 to the right into its working position (FIG. 1a).

In the example as shown, the pressure medium is supplied to the directional control valves 18,20 in crossing manner which means that the pressure medium flows via the slide gate of one control valve to the other control valve.

Turning now to FIG. 1b which shows the safety valve 10 during faulty switching, it may be seen that only one pilot valve, e.g. pilot valve 16 is actuated. Such faulty switching may occur when failing to actuated both pilot valves 14,16 within the predetermined time interval or when simultaneously actuating both pilot valves but releasing or reversing one so that the proper switching according to FIG. 1a cannot be obtained.

As is shown in FIG. 1b, only pilot valve 16 is in switch position while pilot valve 14 is still in its idle stage. The control valve 20 and the affixed slide gate 24 are shifted into switch position via pilot valve 16 by the pressure prevailing in the reservoir 52. Thus, the pressure medium flows from inlet P via line 28 and opened orifice of slide gate 24 and via line 36 to the valve seat of control valve 18. Since the valve seat is, however, closed, the pressure medium is prevented from flowing to the consumer 12 which is relieved or vented via consumer line 58, line 38 and control valve 18 to return connection R.

The amount of pressure medium flowing from inlet P via throttle 30 of slide gate 22 and control valve 20 as well as via line 40 is kept to a minimum in view of throttle 30 so that only a very low residual prssure is obtained which is insufficient to move the piston 76 of consumer 12 to the right against the force of spring 110. Moreover, since the reservoir 50 is linked via line 34, control valve 20, lines 40 and 38 as well as via control valve 18 to the return connection R and thus relieved, control valve 18 cannot be changed into switch position even upon actuation of pilot valve 14 as reservoir 50 is empty and thus no pressure exists at pilot valve 14. Consequently, cylinder 75 cannot be shifted into a working position.

Referring now to FIG. 2 which shows schematically one embodiment of a two-hand safety control mechanism according to the invention for a consumer 12 which in the present nonlimiting example includes a double acting cylinder 79 in which a pressure medium e.g. compressed air is admitted at both sides of piston 76. The safety control mechanism includes a safety valve 10 which corresponds essentially to the safety valve as described in connection with FIGS. 1,1a,1b. Thus, the same reference numerals have been used for corresponding parts. In FIG. 2, the safety valve 10 occupies the idle position as shown in FIG. 1 and is provided to move the consumer 12 into working position in which pressure medium is admitted via consumer line 58 into the cylinder 79 at the end face of piston 76.

In contrast to the described conventional control mechanism, the idle position of the consumer 12 in the embodiment according to the invention as shown in FIG. 2, is not obtained by spring force; rather cylinder 79 is connected at the side of the piston rod 77 of piston 76 to inlet P via lines 70 and 74. Interposed in line 70 is a check valve 72 and a directional control valve 68. Thus, the pressure medium flows via check valve 72 and the control valve 8 which is in switch position into cylinder 79 thereby shifting the piston 76 in the idle position as shown in FIG. 2. At its end face, the piston 76 is vented or relieved via consumer line 58, lines 38,40 as well as directional control valves 18,20 and return connections R and R1. Cylinder 79 and piston 76 are thus maintained in their idle position by the pressure in inlet P.

By actuating the pilot valves 14,16, pressure builds up at the control valves 18,20 so that pilot valves 14,16, control valves 18,20 and slide gates 22,24 are in the position shown in FIG. 1a. In this switch position of the safety valve 10, pressure medium is admitted into cylinder 79 of consumer 12 via line 58.

Branching off the control lines 54,56 are lines 60,62 which lead via respective throttles 78,80 to a fluidal AND-element in form of a valve 64 (in the following referred to as AND-valve). Line 60 branching off control line 54 defines the first input into AND-valve 64 while line 62 connected to control line 56 forms its second input. Output 66 of AND-valve 64 is the control input of the directional control valve 68.

Upon actuation of pilot valves 14 and 16, the pressure in control lines 54,56 and thus in lines 60,62 builds up so that both inputs of the AND-valve 64 are under pressure as well. The AND-valve 64 controls the output when both pilot valves 14,16 are actuated simultaneously or within a predetermined time interval so that control valve 68 is reversed thereby relieving cylinder 79 at the side of the piston rod 77 via line 74, control valve 68 and return connection R3.

It is thus to be noted that the pressure build up in cylinder 79 at one side thereof is provided via the safety valve 10 and connection A while simultaneously cylinder 79 is relieved via connection B and control valve 68 at the other side of cylinder 79 so that piston 76 is shifted in working position i.e. to the right. The displacement of the piston 76 within the cylinder 79 of consumer 12 in working position is thus solely obtained via the safety valve 10 which is a dynamical, self-regulating double three-way/two-way directional control valve. Returning of the piston 76 into its idle position is provided by the control valve 68 which connects line 74 with inlet P to build up the pressure at the side of the piston rod within cylinder 79. Since the check valve 72 cuts off the pressure medium flow towards the inlet P, a pressure drop will not affect the piston 76 from being shifted into its idle position. In the present nonlimiting example, control valve 68 is a simple three-way/two-way directional control valve.

Figure 3:
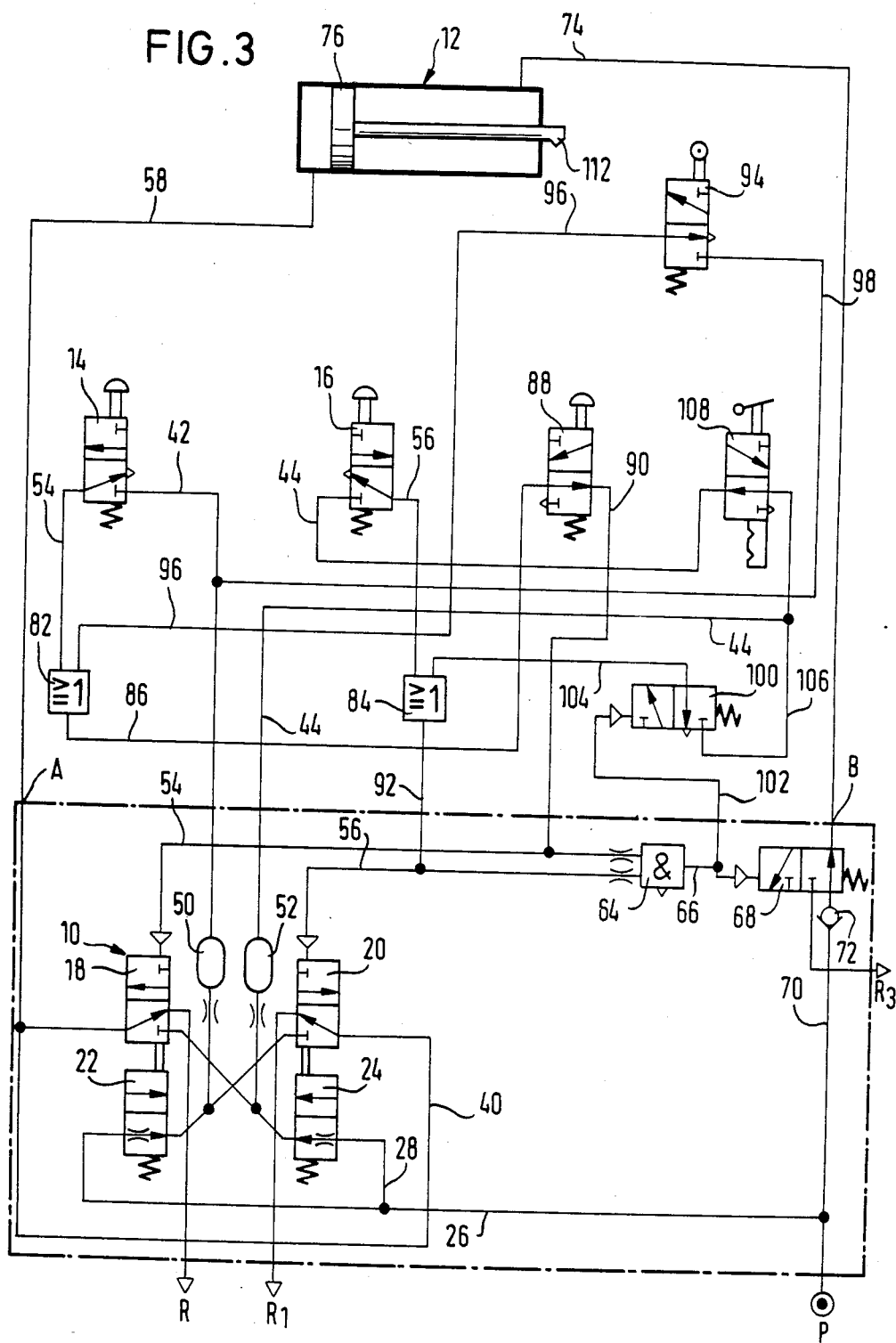
FIG. 3 is a schematic illustration of a modification of the two-hand safety control mechanism of FIG. 2.

Referring now to FIG. 3 which shows a modification of the two-hand safety control mechanism as illustrated and described with respect to FIG. 2. Same reference numerals are used in FIG. 3 for corresponding parts in FIG. 2. Thus, the two-hand safety control mechanism of FIG. 3 includes the safety valve 10, the AND-valve 64, directional control valve 68 and consumer 12 in form of a double-acting cylinder 79. The idle position of piston 76 as shown in FIG. 3 is provided by building up the pressure within the consumer 12 at the side of the piston rod 77 via line 70, check valve 72, control valve 68 and line 74. Both inputs of AND-valve 64 are linked to the control lines 54, 56 which connect the pilot valves 14,16 with the directional control valves 18,20. The mode of operation of these parts has been described with reference to FIG. 2.

In addition, the two-hand safety control mechanism of FIG. 3 includes a control device which maintains the switch position or working position of cylinder 79 i.e. piston 76 until a signal is transmitted for reversing the piston 76 into its idle position without requiring to continuously actuating or pressing the pilot valves 14,16.

The control device includes a first OR-element 82 in form of a valve (in the following referred to as OR-valve) provided in the control line 54 so that the output of pilot valve 14 defined one input of the OR-valve 82. In like manner, a second OR-valve 84 is arranged in control line 56 so that the output of pilot valve 16 defines one input of OR-valve 84. OR-valve 82 has an output 86 which leads to the input of a pilot valve 88 whose output is linked to control line 54 via a connecting line 90 and thus to the control input of the directional control valve 18. The output 92 of OR-valve 84 is directly linked to control line 56 and thus to the control input of directional control valve 20.

As is illustrated in FIG. 3, the piston rod 77 is provided at its end remote to the piston 76 with a catch 112 which cooperates with a pilot valve 94 by shifting the latter into switch position when the piston 76 occupies its working position as will be described hereinafter. The input of pilot valve 94 is connected to control line 42 of pilot valve 14 via line 98 while its output defines via line 96 the second input of OR-valve 82.

Output 66 of AND-valve 64 is connected via a control line 102 to the control input of a directional control valve 100 whose input is linked via a connection line 106 to select line 44 of pilot valve 16 while its output is connected via line 104 to OR-valve 84 to define the second input thereof.

In the nonlimiting example of FIG. 3, one of the select lines 42,44—for example select line 44 of pilot valve 16—is linked to a pilot valve 108 which can interrupt the pressure supply i.e. the supply of the pressure medium (e.g. compressed air) to the pilot valve 16. In FIG. 3 which illustrates the consumer 12 in its idle position, the valve 108 is switched to allow passage of pressure medium. When actuating the valve 108 for reversing the latter, the supply of pressure medium to pilot valve 16 is interrupted so that the piston 76 cannot perform a working stroke despite existing working pressure P and actuation of pilot valves 14 and 16.

After having described the individual parts of the two-hand safety control mechanism, its mode of operation will not be described in more detail.

As already mentioned, FIG. 3 shows the consumer in its idle position which means that cylinder 79 is under pressure at the side of the piston rod 77 and relieved at the end face of piston 76 via control valves 18,20 and the return connections R,R1. The reservoirs 50,52 provide the pressure via select lines 42,44 to the pilot valves 14,16 which at this stage block a passage. When actuating the pilot valves 14,16 and thus opening the passage therethrough, pressure builds up via lines 54,56 at the one input of the OR-valves 82,84 and consequently the output lines 86 and 92 of OR-valves 82,84 are also under pressure. Valve 88 is switched to allow passage of the pressure medium so that a pressure build up is obtained at the control valves 18,20 and on both inputs of AND-valve 64. The control valves 18,20 are reversed thereby occupying the switch position as shown in FIG. 1a so that pressure medium is admitted to cylinder 79 via connection A and consumer line 58.

Since both its inputs are under pressure, the AND-valve 64 allows passage therethrough so that its output 66 reverses valve 68 via control line 67 as well as valve 100 via control line 102. As described in connection with FIG. 2, the switching of valve 68 causes a venting or relief of the cylinder 79 at the side of the piston rod 77 through line 74, valve 68 and return connection R3. Reversing valve 100 allows the pressure medium to flow from control line 44 via line 106 through valve 100 to output line 104 and consequently to OR-valve 84 whose both inputs are then under pressure.

When the piston 76 is shifted to its working position, catch 112 at the end of piston rod 77 actuates valve 94 which is switched to "passage" so that the second input of OR-valve 82 is under pressure as the pressure medium can now flow through line 98 which branches off select line 44, valve 94 and line 96.

At this stage, both pilot valves 14,16 can be released as the consumer 12 will not automatically maintain its working position. The pilot valves 14,16 return to the position as shown in FIG. 3 so that the pressure is removed from one of the input of OR-valves 82,84 via lines 54,56, respectively; however, since the other input of the OR-valves 82,84 is still under pressure via lines 96,104, the respective outputs 86,92 of OR-valves 82,84 remain under pressure as are the control lines 54,56 leading to the directional control valves 18,20 and AND-valve 64. Thus, safety valve 10 remains in switch position and the consumer 12 maintains its working position.

In order to cancel the automatic retention of the position of safety valve 10 and consumer 12 as described, valve 88 is to be actuated. By reversing valve 88 from the position as shown in FIG. 3 in its other switch position, the output signal of OR-valve 82 as transmitted via line 86 is blocked so that pressure is removed from directional control valve 18 and from one input of AND-valve 64. Output 66 of AND-valve 64 is thus without pressure so that valves 68,100 and control valve 18 with slide gate 22 shift into the idle position as shown in FIG. 3. Connection A of cylinder 79 is relieved and pressure builds up at connection B thereby moving the piston 76 to the left into its idle position.

It is to be noted that the cancel signal via valve 88 is dominant over the output signal of the pilot valves 14,16 which means that despite actuated pilot valves 14,16, the displacement of the piston 76 into the idle position will not take place as this is only achieved by actuating valve 88. Once the piston 76 is in the idle position, a further working stroke can only be triggered after releasing the pilot valves 14,16 and valve 88.

It is certainly within the scope of the invention to erase the described automatic retention via a time control mechanism so that e.g. valve 88 after elapse of a predetermined holding time is reversed by e.g. a pneumatic signal to trigger the reverse stroke of the piston 76.

Extending the cylinder 79 is obtained only when both pilot valves 14,16 of the two-hand safety control mechanism are actuated simultaneously within a predetermined time interval. Moreover, valves 94,100 and 88 must be in their idle position as must be valve 108 if provided.

Figure 4A:
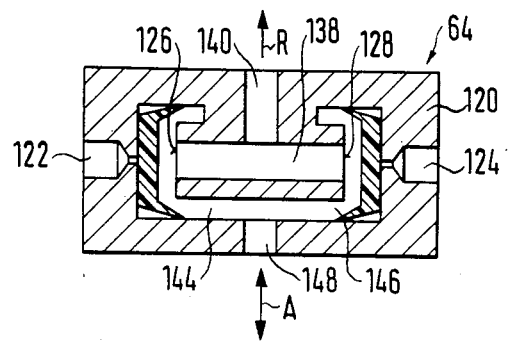
FIG. 4a is a cross sectional view of an AND-valve as used in the two-hand safety control mechanism of FIGS. 2 and 3 in its idle stage.
Figure 4B:
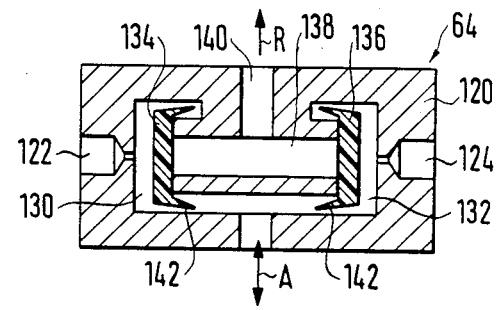
FIG. 4b is a cross sectional view of the AND-valve of FIG. 4a in its switch position.
Figure 4C:
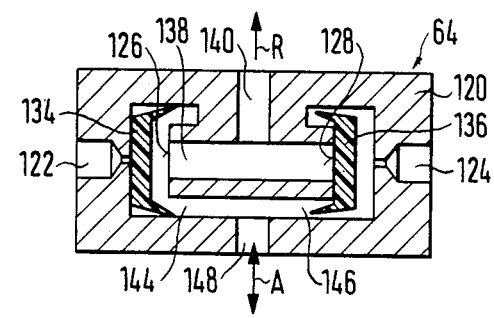
FIG. 4c is a cross sectional view of the AND-valve of FIG. 4a during faulty switching.

Turning now to FIGS. 4a, 4b, 4c which show a preferred embodiment of the AND-valve in its idle position, switch position and during faulty switching.

The AND-valve 64 includes a housing 120 which is provided with two inlets 122,124 at opposite sides of the housing 120. Accommodated within the housing 120 are a pair of valve seats 126,128 extending parallel between a consumer connection A and a return connection or vent R. The valve seats 126,128 are opened and closed by sealing elements 134,136 accommodated in respective chambers 130,132 within the housing 120. Inlet 122 opens into chamber 130 while inlet 124 is connected to chamber 132. Connecting the valve seats 126,128 is a channel 138 from which a channel 140 branches off to lead to the return connection or vent R. The chamber 130 is linked via a connecting channel 146 to a channel 148 which in turn leads to consumer A.

In the nonlimiting example of FIGS. 4a, 4b, 4c, the sealing elements 126,128 are essentially of disk-shape and are provided along the circumference with an elastic sealing lip 142 which extends radially outwards against the inner wall of the respective chamber 130,132 as especially illustrated in FIG. 4a. Preferably, the sealing lip 142 is directed away from the inlets 122,124 and towards the consumer connection A and return connection R respectively.

The mode of operation of AND-valve 64 will now be described in more detail.

In FIG. 4a, both inlets 122,124 are pressureless i.e. no pressure medium flows to inlets 122,124. Both valve seats 126,128 are open because the sealing elements 134,136 are moved towards the inlets 122,124 by the pressure medium flowing through consumer line A, channels 144,146, valve seats 126,128, connecting channel 138 and channel 140 to connection R. Thus, consumer 12 is vented. The sealing lip 142 of each sealing element 134,136 rests against the inner wall of the respective chambers 130,132.

When pressure builds up in inlets 122,124, the sealing elements 134,136 are axially moved by the pressure medium towards each other against the valve seats 126,128 which are thus closed thereby blocking the connection between vent R and consumer connection A (FIG. 4b). As soon as the valve seats 126,128 are closed, the elastic sealing lips 142 of the sealing elements 134,136 are forced inwardly by the pressure medium so as to disengage from the inner wall thereby allowing a passage of the pressure medium from chambers 130,132 via channels 144,146 to consumer connection A. Consequently, pressure builds up in consumer connection A (FIG. 4b).

A removal of pressure from inlets 122,124 causes the pressure prevailing at consumer connection A to axially displace the sealing elements 134,136 into the position as shown in FIG. 4a and the sealing lips 142 to be pressed against the inner wall of chambers 130,132. Thus, sealing elements 134,136 are lifted off the valve seats 126,128 which are opened so that consumer is linked to connection R and thus relieved.

In FIG. 4c, the AND-valve 64 is shown during a faulty switching in which e.g pressure medium is admitted to only one inlet e.g. inlet 124. Accordingly, only valve seat 128 is closed; however, the pressure medium is not prevented from flowing to vent R as it flows past the sealing lip 142 of sealing element 136 through the open valve seat 126 to vent R. Thus, only a small residual pressure prevails at consumer connection A. By suitably dimensioning the cross section of the inlets relative to the cross section of the outlet (i.e. cross section of valve seats 126,128, connecting channel 138, channel 140), this residual pressure can be kept to a minimum. For example, the cross section of the inlets 122,124 can be dimensioned with a diameter of 1–2 mm while the cross section of the outlet has a diameter of 5–6 mm.

From the preceding description, it follows that the valve 64 is connected to vent R in case only one input signal exists i.e. pressure build up occurs only at one of its inlets—while at the consumer connection A essentially no pressure is available. The mentioned residual pressure is too small to actuate the consumer.

While the invention has been illustrated and described as embodied in a Two-Hand Safety Control Mechanism, it is not intended to be limited to the details shown since various modifications and structural changes may be made without departing in any way from the spirit of my present invention.

What is claimed as new and desired to be protected by Letters Patent is set forth in the appended claims.

We claim:

1. A two-hand safety control mechanism for a consumer having an inlet connection and being operated by a pressure medium fed from a supply connection; comprising:

valve means for shifting the consumer between an idle position and a working position and including first and second directional control valves placed in parallel and actuated by pilot valves via connecting control lines, each of said directional control valves being mechanically linked with a slide gate and communicating with the supply connection via the slide gate of the other one of said directional control valves, said directional control valves being linked to said inlet connection for supplying pressure medium to one side of the consumer;

a third directional control valve connecting the other side of the consumer directly to the supply connection; and an AND-valve having at least two inputs connected to said control lines arranged between said first and second directional control valves and said associated pilot valves and an output cooperating with said third directional control valve.

2. A safety control mechanism as defined in claim 1, and further comprising control means for maintaining the working position of the consumer and including first and second OR-valves respectively provided in said control lines and operatively connected with said pilot valves in such a manner that the output of said pilot valves defines a first input of said first and second OR-valves.

3. A safety control mechanism as defined in claim 2, and further comprising a first control valve for cancelling the retention of the working position of the consumer as provided by said control means, at least one of said first and second OR-valves having an output communicating with one of said first and second directional control valves via said first control valve.

4. A safety control mechanism as defined in claim 2 wherein said control means further comprises a second control valve actuated by the consumer to be shifted in switch position, said second control valve having an input connected to one of said pilot valves and an output defining a second input of one of said OR-valves.

5. A safety control mechanism as defined in claim 4 wherein said control means further comprises a fourth directional control valve actuated by said output of sand AND-valve and having an input connected to said other pilot valve and an output defining a second input of said other OR-valve.

6. A safety control mechanism as defined in claim 2 wherein each of said pilot valves is provided with a select line, and further comprising a third control valve provided in the select line of at least one of said pilot valves so as to block a supply of pressure medium to said pilot valve.

7. A safety control mechanism as defined in claim 1 wherein said AND-valve includes a housing provided with two inlets, a connection to the consumer and a vent connection and defining two valve seats extending parallel to each other between said consumer connection and vent connection, said AND-valve further including sealing element cooperating with said valve seats such that said valve seats are closable by the pressure medium supplied through said inlets and acting on said sealing elements.

8. A safety control mechanism as defined in claim 7 wherein each of said sealing elements is provided along its circumference with an elastic sealing lip.

9. A safety control mechanism as defined in claim 8 wherein said sealing lips are directed away from said inlets.

10. A safety control mechanism as defined in claim 7 wherein said housing defines at least two chambers respectively communicating with said inlets and said consumer connection, said sealing elements being axially movable within the associated one of said chambers.

11. A safety control mechanism as defined in claim 10 wherein each of said chambers defines an inner wall, said sealing lips being inwardly lifted off said inner wall of said chambers when said AND-valve is in switch position in which said valve seats are closed by said sealing elements so that said inlets are connected with said consumer connection.

12. A safety control mechanism as defined in claim 10, and further comprising first channel means connection said valve seats with said vent connection and second channel means connection said valve seats with said consumer connection via said chambers.

13. A safety control mechanism as defined in claim 7 wherein said inlets have a cross section of a diameter of 1-2 mm.

14. A safety control mechanism as defined in claim 7 wherein said first channel means includes a connecting channel linking said valve seats and a further channel branching off said connecting channel and leading to said vent connection, said valve seats, said connecting channel and said further channel having each a cross section of a diameter of 5-6 mm.

15. A safety control mechanism as defined in claim 1, and further comprising a check valve interposed between said third directional control valve and the supply connection.

16. A two-hand safety control mechanism for a consumer; comprising:
first valve means cooperating with the consumer for shifting the latter from an idle position to a working position by admitting a pressure medium from a supply connection to one side of the consumer; and
actuating means for controlling said first valve means; and
second valve means for relieving and pressurizing the other side of the consumer, said second valve means including an AND-valve having at least two inputs operatively connected to said actuating means and an output, and a control valve controlled by said output of said AND-valve and provided between the supply connection and the consumer, said second valve means relieving the other side of the consumer when the latter is moved to its working position by said first valve means and allowing admission of pressure medium to the other side of the consumer to return the latter to its idle position.

17. A safety control mechanism as defined in claim 16, and further comprising third valve means for maintaining the working position of the consumer, said third valve means including two OR-valves each of which having a first input operatively connected to said actuating means and an output linked to said first valve means, and further including first and second control valves whose input is controlled by said first valve means and whose output defines a second input of said OR-valves.

18. A safety control mechanism as defined in claim 17, and further comprising erasing means for cancelling the retention of the working position of the consumer, said erasing means including a further control valve provided between the output of at least one of said OR-valves and one input of said AND-valve so that an actuation of said further control valve causes a relieving of the one side of the consumer and simultaneously a pressure build up of the other side of the consumer.

* * * * *